US012737659B2

(12) United States Patent
Luo et al.

(10) Patent No.: US 12,737,659 B2
(45) Date of Patent: Sep. 15, 2026

(54) QUANTUM CHIP AND QUANTUM COMPUTER

(71) Applicant: HUAWEI TECHNOLOGIES CO., LTD., Shenzhen (CN)

(72) Inventors: Yanxing Luo, Chengdu (CN); Peng Zhao, Shenzhen (CN); Xianfeng Tang, Shenzhen (CN); Kunzhe Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 671 days.

(21) Appl. No.: 18/321,851

(22) Filed: May 23, 2023

(65) Prior Publication Data

US 2023/0289646 A1 Sep. 14, 2023

Related U.S. Application Data

(63) Continuation of application No. PCT/CN2021/101720, filed on Jun. 23, 2021.

(30) Foreign Application Priority Data

Nov. 25, 2020 (CN) ........................ 202011341553.5

(51) Int. Cl.
*G06N 10/40* (2022.01)

(52) U.S. Cl.
CPC .................................. *G06N 10/40* (2022.01)

(58) Field of Classification Search
CPC ...................................................... G06N 10/40
USPC ......................................................... 716/100
IPC ...................................................... G06N 10/40
See application file for complete search history.

(56) References Cited

U.S. PATENT DOCUMENTS 10,134,972 B2 * 11/2018 Oliver .................... H10N 60/12
10,971,672 B2 * 4/2021 Olivadese .......... H10N 60/0912
2018/0013052 A1 * 1/2018 Oliver .................... H10N 60/12
2020/0035902 A1 * 1/2020 Olivadese ............. H10N 60/12

FOREIGN PATENT DOCUMENTS

CN 111081768 A 4/2020
WO 2020036673 A2 2/2020

OTHER PUBLICATIONS

J Wenner et al., "Wirebond crosstalk and cavity modes in large chip mounts for superconducting qubits", arxiv: 1011.4982v1,Nov. 23, 2010,XP080464104,total 13 pages.

(Continued)

*Primary Examiner* — Suchin Parihar

(57) ABSTRACT

A quantum chip and a quantum computer are disclosed to resolve problems such as high difficulty in preparing the quantum chip and a low yield rate. The quantum chip provided in the present disclosure includes a substrate, M subchips, a coupling structure, and a cavity mode suppression structure. Each subchip includes N quantum bits, and the M subchips are spaced apart on a surface of the substrate. The coupling structure is configured to implement an interconnection between the M subchips. The cavity mode suppression structure is disposed on an edge of each subchip and/or in a gap between the M subchips, and is configured to increase a cavity mode frequency of the quantum chip. In the quantum chip provided in the present disclosure, the quantum chip includes the M subchips, so that preparation difficulty is effectively reduced and a preparation yield rate is improved.

17 Claims, 11 Drawing Sheets

(56) References Cited

OTHER PUBLICATIONS

International Search Report and Written Opinion issued in PCT/CN2021/101720, dated Sep. 27, 2021, 8 pages.
Extended European Search Report issued in EP21896292.6, dated Apr. 3, 2024, 13 pages.

* cited by examiner 30
20a
20b

QUANTUM CHIP AND QUANTUM COMPUTER

CROSS-REFERENCE TO RELATED APPLICATIONS

This application is a continuation of International Application No. PCT/CN2021/101720, filed on Jun. 23, 2021, which claims priority to Chinese Patent Application No. 202011341553.5, filed on Nov. 25, 2020. The disclosures of the aforementioned applications are hereby incorporated by reference in their entireties.

TECHNICAL FIELD

The present disclosure relates to the field of quantum computing technologies, and in particular, to a quantum chip and a quantum computer.

BACKGROUND

A quantum computer is an apparatus that can implement quantum computing. The quantum computer follows the laws of quantum mechanics to implement mathematical and logic operations, and to perform information processing and storage. In the quantum computer, quantum information is encoded by using quantum states. The quantum states may be superimposed or entangled. Therefore, parallel computing can be implemented, which helps improve computing speed and efficiency.

A quantum chip is a core component of the quantum computer, and operating performance of the quantum chip determines overall performance of the quantum computer. To make the quantum chip have better operating performance, more quantum bits need to be integrated into the quantum chip. However, when the quantum chip is prepared, because high precision is difficult to be achieved in a processing process, and stability during preparation fluctuates due to various factors, a specific proportion of defects may occur in the prepared quantum chip. When more quantum bits are integrated into the quantum chip, this defect is multiplied and seriously affects a yield rate of the quantum chip.

SUMMARY

The present disclosure provides a quantum chip and a quantum computer that can effectively ensure a preparation yield rate.

According to one aspect, the present disclosure provides a quantum chip, including a substrate, M subchips, a coupling structure, and a cavity mode suppression structure. Each subchip includes N quantum bits. The M subchips are spaced apart on a surface of the substrate. The coupling structure is configured to implement an interconnection between the M subchips. The cavity mode suppression structure is disposed on an edge of each subchip and/or in a gap between the M subchips, and is configured to increase a cavity mode frequency of the quantum chip. Mis a positive integer greater than 1, and N is a positive integer greater than or equal to 1. During preparation, the M subchips may be separately prepared, so that a preparation yield rate can be effectively improved. For example, when M*N quantum bits need to be integrated into the quantum chip, the N quantum bits may be prepared in each subchip. The preparation yield rate of the chip is highly related to a quantity of quantum bits. Therefore, when a small quantity of quantum bits is integrated into the chip, the preparation yield rate of the chip is effectively improved. Therefore, in the quantum chip provided in the present disclosure, the quantum chip includes the M subchips, so that the yield rate of the quantum chip is effectively improved. In addition, when a quality defect occurs in a subchip, only the subchip needs to be replaced with a qualified subchip, thereby significantly resolving problems such as high costs and resource waste caused by the quality defect. In addition, a combination of the M subchips facilitates a layout of the cavity mode suppression structure in each subchip, and also facilitates a layout of the cavity mode suppression structure on the substrate. This helps reduce layout difficulty of the cavity mode suppression structure, and effectively improve a preparation yield rate of the cavity mode suppression structure, to effectively increase the cavity mode frequency and reduce signal crosstalk. In addition, this also facilitates a good layout of a control line.

In an example embodiment, the coupling structure may be a resonant cavity, a capacitor, or the like. In specific implementation, a type of the coupling structure may be properly selected based on an actual situation. This is not limited in the present disclosure.

That the cavity mode suppression structure is disposed on an edge of each subchip and/or in a gap between the M subchips means that the cavity mode suppression structure may be disposed on the edge of each subchip, or may be disposed in the gap between subchips; or means that the cavity mode suppression structure may be disposed on the edge of each subchip and in the gap between subchips at the same time.

A plurality of ground solder joints may be disposed on the edge of each subchip or in a position close to the edge, and the plurality of ground solder joints are all electrically connected to the substrate. After the plurality of ground solder joints are connected to the substrate, a structure (the cavity mode suppression structure) that can increase a cavity mode frequency of the subchip can be formed, so that the cavity mode frequency of the subchip can be effectively increased, the cavity mode frequency of the entire quantum chip can be increased, and signal crosstalk between subchips can be eliminated.

When the cavity mode suppression structure is disposed in the gap between the M subchips, the cavity mode suppression structure may be a metal body or a solid structure whose surface is provided with a conductive layer. When the cavity mode suppression structure is a metal body, the metal body may be formed by using a superconducting metal material (for example, niobium zirconium alloy or niobium titanium alloy), and then the formed metal body is disposed on the substrate. Alternatively, the metal body may be directly prepared on the substrate by using a process such as micro-nano preparation. When the cavity mode suppression structure is a solid structure whose surface is provided with a metal layer, a solid structure having a specific shape may be formed by using materials such as silicon and ceramics, and then a metal layer is prepared on a surface of the solid structure by using processes such as vapor deposition and spraying. Finally, the formed cavity mode suppression structure is disposed on the substrate. A material of the metal layer may be a superconducting material such as niobium zirconium alloy or niobium titanium alloy, or may be another metal material. Alternatively, in some other implementations, a convex structure having a specific shape may be directly prepared on the substrate by using a process such as etching, and then a metal layer is prepared on the convex structure, to form the cavity mode suppression structure.

When the cavity mode suppression structure is the metal body or the solid structure whose surface is provided with a conductive layer, both the coupling structure and the cavity mode suppression structure are located in the gap between the subchips. Therefore, during specific arrangement, the cavity mode suppression structure and the coupling structure may be spaced apart on the surface of the substrate, or may be stacked.

The subchip may be disposed on the substrate by using processes such as flip-chip and wire bonding, and an electrical connection is implemented between the subchip and the substrate. Certainly, in specific implementation, the subchip may alternatively be disposed on the substrate by using another preparation process. This is not limited in the present disclosure.

When a plurality of subchips are arranged, the plurality of subchips may be arranged in a rectangular array manner, or may be arranged in a polygonal manner such as a circle, an ellipse, or a triangle. This is not limited in the present disclosure.

In addition, when the coupling structure is laid out, a quantity of coupling structures and a connection relationship between the coupling structure and the subchip may also be flexibly set.

For example, the coupling structure may include a first coupling structure and a second coupling structure. The first coupling structure may be disposed between two adjacent subchips, and is configured to implement a connection between the two adjacent subchips. The second coupling structure may be disposed between two subchips disposed diagonally, and is configured to implement a connection between the two subchips disposed diagonally.

In specific implementation, the coupling structure may include only the first coupling structure, or may include only the second coupling structure. Alternatively, the coupling structure may include both the first coupling structure and the second coupling structure. In addition, when the coupling structure includes both the first coupling structure and the second coupling structure, the first coupling structure and the second coupling structure may be directly connected, or may not be directly connected.

According to the other aspect, the present disclosure further provides a quantum computer, including a control system, a low-temperature transmission system, and any one of the foregoing quantum chips. The control system is in a signal connection to the quantum chip by using the low-temperature transmission system. The low-temperature transmission system includes a low-temperature microwave circuit and a refrigeration component. The refrigeration component is configured to provide a low temperature environment for the low-temperature microwave circuit and the quantum chip, to create a superconducting condition for the low-temperature microwave circuit and the quantum chip and prevent adverse effects such as thermal noise. The control system is connected to the quantum chip by using the low-temperature microwave circuit.

DESCRIPTION OF EMBODIMENTS

Figure 1:
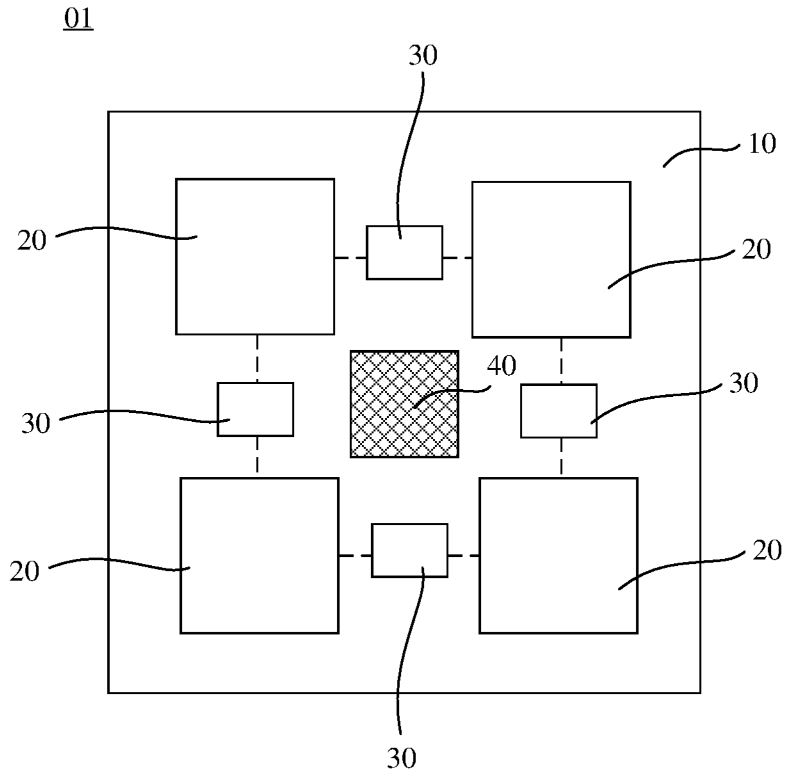
FIG. 1 is a schematic diagram of a flat structure of a quantum chip according to an embodiment of the present disclosure.

To make the objectives, technical solutions, and advantages of the present disclosure clearer, the following further describes the present disclosure in detail with reference to accompanying drawings.

As a core part of a quantum computer, a quantum chip is a hardware apparatus that performs quantum computing and quantum information processing. The quantum chip usually uses superposition and entanglement of quantum states to perform quantum bit-based operations. Therefore, as long as a physical property of a matter has two quantum states that are easy to operate, the matter may be a basis for preparing a quantum bit. Based on different physical systems used to construct the quantum bit, the quantum bit mainly includes a superconducting quantum circuit, a semiconductor quantum dot, an ion trap, a diamond vacancy, a topological quantum, a photon, and the like in a physical implementation.

A superconducting quantum chip based on a Josephson junction has become one of the main research directions because the chip can be better prepared by using a conventional semiconductor processing process. In the superconducting quantum chip, a superconducting circuit formed by the Josephson junction is mainly used to form the quantum bit. The quantum bit is a basis of quantum information processing. In the superconducting quantum chip, a quantity of integrated quantum bits determines information processing performance of the superconducting quantum chip. In order to improve the information processing performance of the superconducting quantum chip, more quantum bits may be integrated into the superconducting quantum chip. In a current preparation process, the quantum bit is usually prepared on a single substrate. However, based on current process precision and stability, a specific quality defect inevitably occurs when the quantum bit is prepared. When more quantum bits are integrated into the quantum chip, the defect is multiplied. If one of the quantum bits has a quality defect, quality of the entire quantum chip is affected, a resource is wasted, and losses caused by the defect are high.

In addition, each quantum bit requires a plurality of precise microwave signals for quantum state manipulation and isolation from an environment required to maintain sufficient quantum coherence. When more quantum bits are prepared in the single substrate, difficulty in arranging control lines is increased, signal crosstalk is easily generated between the control lines, and a large amount of environmental noise is introduced, which affects coherence of the quantum bits and limits precision of quantum state manipulation. In addition, it is also unfavorable to dispose a related structure used to increase a cavity mode frequency of the quantum chip, and the coherence of the quantum bits is easily affected.

Therefore, an embodiment of the present disclosure provides a quantum chip that can effectively improve a preparation yield rate. In addition, when there is a quality defect in the quantum chip, high losses caused by the quality defect can be effectively reduced. In addition, difficulty in arranging control lines can be reduced, and a cavity mode frequency can be improved, thereby helping improve signal processing performance of a subchip.

To make objectives, technical solutions, and advantages of the present disclosure clearer, the following further describes the present disclosure in detail with reference to the accompanying drawings and specific embodiments.

Terms used in the following embodiments are merely intended to describe specific embodiments, but are not intended to limit the present disclosure. Terms "one", "a", "the foregoing", "the", and "the one" of singular forms used in this specification and the appended claims of the present disclosure are also intended to include plural forms like "one or more", unless otherwise specified in the context clearly. It should be further understood that in the following embodiments of the present disclosure, "at least one" and "one or more" refer to one, two, or more. The term "and/or" is used to describe an association relationship between associated objects and represents that any one of three relationships may exist. For example, A and/or B may represent one the following cases: Only A exists, both A and B exist, or only B exists, where A and B may be singular or plural. The character "/" generally indicates an "or" relationship between the associated objects.

Reference to "an embodiment", "some embodiments", or the like described in this specification indicates that one or more embodiments of the present disclosure include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "comprise", "have", and their variants all mean "include but are not limited to", unless otherwise emphasized in another manner.

It should be noted that, for ease of understanding the technical solutions of the present disclosure, the following embodiments are described by using a superconducting quantum chip based on a Josephson junction as an example. Alternatively, it may be understood that a quantum bit mainly includes a superconducting quantum circuit in a physical implementation. Certainly, when the quantum bit is implemented in another physical implementation (such as a semiconductor quantum dot or an ion trap), the quantum bit may also be properly applicable in a same or similar manner as the following implementations.

FIG. 1 is a schematic diagram of a structure of a quantum chip 01 according to an embodiment of the present disclosure. The quantum chip 01 includes a substrate 10, four subchips 20, four coupling structures 30, and one cavity mode suppression structure 40. The four subchips 20 are spaced apart on a first surface (upper surface) of the substrate 10 in a rectangular array manner. Each of the four coupling structures 30 is disposed between two adjacent subchips 20, and is configured to implement a connection between the two adjacent subchips 20, thereby implementing interconnections among the four subchips 20. The cavity mode suppression structure 40 is disposed among the four subchips 20, and is configured to increase a cavity mode frequency of the quantum chip 01.

In summary, in example embodiments, the quantum chip 01 may include M subchips 20 (four subchips are shown in the figure), and N quantum bits are integrated in each subchip 20. The M subchips 20 are interconnected by using the coupling structures 30. Mis an integer greater than 1, and Nis an integer greater than or equal to 1. During preparation, the M subchips 20 may be separately prepared, so that a preparation yield rate can be effectively improved. For example, when M*N quantum bits need to be integrated into the quantum chip 01, the N quantum bits may be prepared in each subchip 20. The preparation yield rate of the chip is highly related to a quantity of quantum bits. Therefore, when a small quantity of quantum bits is integrated into the chip, the preparation yield rate of the chip is effectively improved. On the contrary, when a large quantity of quantum bits is integrated into the chip, the preparation yield rate of the chip is significantly decreased. Therefore, in the quantum chip 01 provided in the present disclosure, the quantum chip 01 includes the M subchips 20, so that the yield rate of the quantum chip 01 is effectively improved. In addition, when a quality defect occurs in a subchip 20, only the subchip 20 needs to be replaced with a qualified subchip 20, thereby significantly improving problems such as high costs and resource waste caused by the quality defect.

In addition, a combination of the M subchips 20 facilitates a layout of the cavity mode suppression structure 40 in each subchip 20, and also facilitates a layout of the cavity mode suppression structure 40 on the substrate 10. This helps reduce layout difficulty of the cavity mode suppression structure 40, and effectively improve a preparation yield rate of the cavity mode suppression structure 40, to effectively increase the cavity mode frequency and reduce signal cross-talk. In addition, this also facilitates a good layout of a control line.

In example embodiments, a material of the substrate 10 may be silicon, sapphire, ceramics, low-temperature co-fired ceramics, a rigid circuit board, or the like. The material of the substrate 10 may be properly selected based on an actual situation. This is not limited in the present disclosure. In addition, a corresponding connection circuit may also be integrated into the substrate 10, to meet electrical connection requirements between a plurality of subchips 20 and between corresponding components in the subchips 20. Alternatively, an electrical connection requirement between the quantum chip 01 and another external component may be met.

During preparation, the subchip 20 may be disposed on one surface of the substrate 10, or may be disposed on both surfaces of the substrate 10 by using a flip-chip process, a wire bonding process, or the like. In example embodiments, a process may be flexibly selected based on an actual situation. This is not limited herein.

It may be understood that each subchip 20 may be prepared by using a conventional quantum chip preparation method. For example, the quantum bit may be prepared in a manner such as a cross capacitor, and adjacent quantum bits may be coupled by using a capacitor, a coupler, or a combination of a capacitor and a coupler. To implement manipulation of quantum information coded by the quantum bit, each quantum bit may be provided with a dedicated microwave control line or a magnetic field control line to implement manipulation. In addition, in order to implement a general logic operation, two-bit gate control may be further implemented. Generally, the two-bit gate control may be implemented by applying a microwave or magnetic field control signal on the capacitor or the coupler between the adjacent quantum bits. In addition, to read the quantum information coded by the quantum bit, a reading unit may be further disposed in each quantum bit. The reading unit may be a microwave resonant cavity or the like. It should be understood that the subchip 20 may be prepared by using a conventional quantum chip 01 preparation method, or may be prepared by using another preparation method. Details are not described herein again.

During specific configuration, a quantity of subchips 20 and relative positions of the subchips 20 on the substrate 10 may also be flexibly disposed.

For example, as shown in FIG. 1, the four subchips 20 are disposed, and the four subchips 20 are spaced apart in the rectangular array manner. In specific implementation, spacings between every two adjacent subchips 20 may be the same or different.

It may be understood that, in another implementation, two, three, or more subchips 20 may alternatively be disposed. When the plurality of subchips 20 is arranged, the plurality of subchips 20 may be arranged in an annular array manner, or may be arranged in a polygonal manner such as an ellipse or a triangle. This is not limited in the present disclosure.

In addition, when the coupling structures 30 are laid out, a quantity of coupling structures 30 and a connection relationship between the coupling structures 30 and the subchips 20 may also be flexibly set.

For ease of understanding the technical solutions of the present disclosure, the following uses an example in which the subchips 20 are arranged in the rectangular array manner for description.

Figure 2:
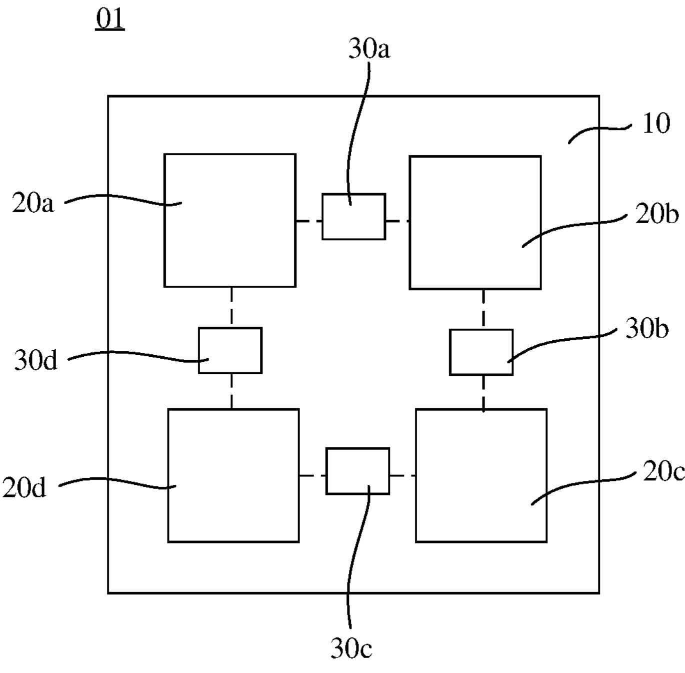
FIG. 2 is a schematic diagram of a flat structure of another quantum chip according to an embodiment of the present disclosure.

As shown in FIG. 2, in an embodiment provided in the present disclosure, the four subchips are respectively a subchip 20*a*, a subchip 20*b*, a subchip 20*c*, and a subchip 20*d*. There are four coupling structures, which are respectively a coupling structure 30*a*, a coupling structure 30*b*, a coupling structure 30*c*, and a coupling structure 30*d*. The coupling structure 30*a* is disposed between the subchip 20*a* and the subchip 20*b*, and is configured to implement an interconnection between the subchip 20*a* and the subchip 20*b*. The coupling structure 30*b* is disposed between the subchip 20*b* and the subchip 20*c*, and is configured to implement an interconnection between the subchip 20*b* and the subchip 20*c*. The coupling structure 30*c* is disposed between the subchip 20*c* and the subchip 20*d*, and is configured to implement an interconnection between the subchip 20*c* and the subchip 20*d*. The coupling structure 30*d* is disposed between the subchip 20*d* and the subchip 20*a*, and is configured to implement an interconnection between the subchip 20*d* and the subchip 20*a*. Finally, the four subchips are interconnected by using the four coupling structures.

In specific implementation, the quantity of coupling structures 30 may be less than the quantity of subchips 20, or may be greater than the quantity of subchips 20.

Figure 3:
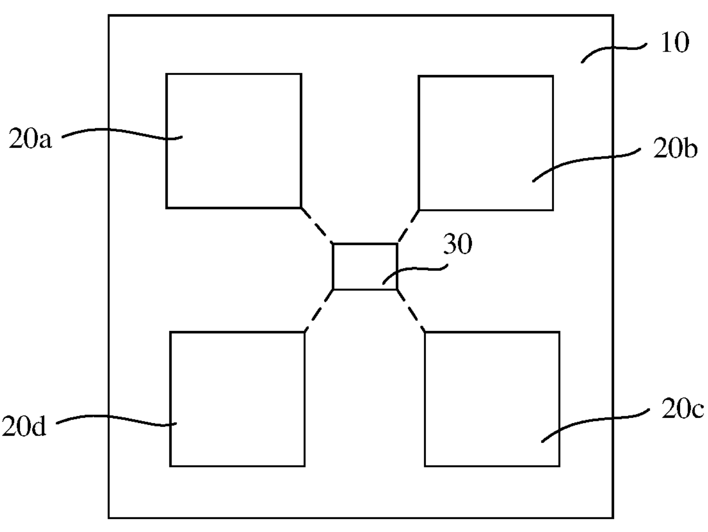
FIG. 3 is a schematic diagram of a flat structure of another quantum chip according to an embodiment of the present disclosure.

For example, as shown in FIG. 3, in another embodiment provided in the present disclosure, one coupling structure 30 is disposed, and the coupling structure 30 is disposed between two subchips disposed diagonally. The subchip 20*a* and the subchip 20*c* are disposed diagonally, and the coupling structure 30 is disposed between the subchip 20*a* and the subchip 20*c*. The subchip 20*b* and the subchip 20*d* are disposed diagonally, and the coupling structure 30 is disposed between the subchip 20*b* and the subchip 20*d*. That is, the coupling structure 30 is connected to the subchip 20*a*, the subchip 20*b*, the subchip 20*c*, and the subchip 20*d*, to implement the interconnections among the four subchips.

Certainly, in some implementations, the coupling structure 30 may be disposed between two adjacent subchips 20, or may be disposed between two subchips 20 disposed diagonally.

Figure 4:
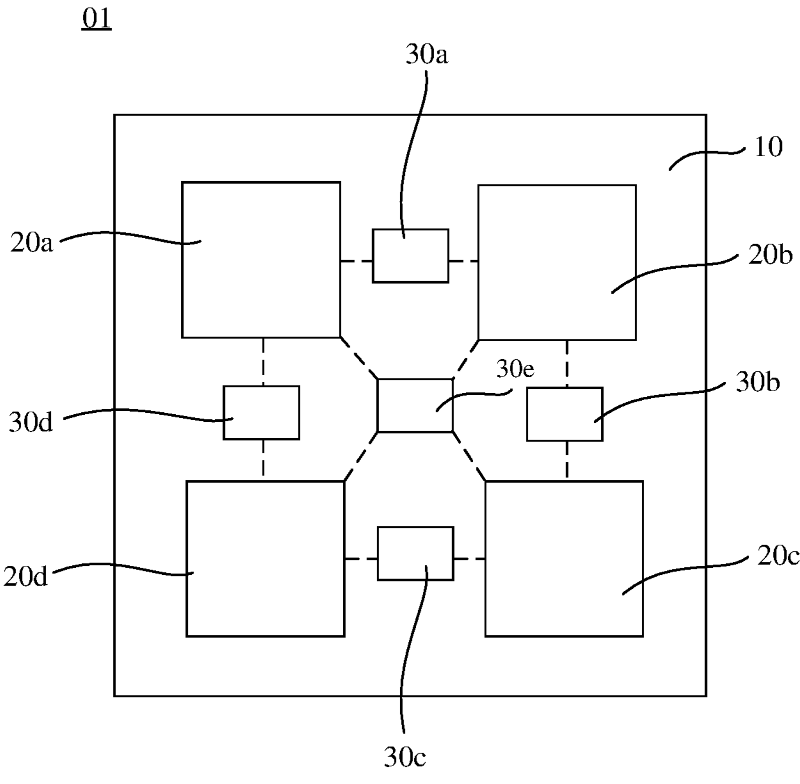
FIG. 4 is a schematic diagram of a flat structure of another quantum chip according to an embodiment of the present disclosure.

For example, as shown in FIG. 4, in an embodiment provided in the present disclosure, the coupling structure includes four first coupling structures and one second coupling structure.

The first coupling structures each are a coupling structure disposed between two adjacent subchips, and are respectively a coupling structure 30*a*, a coupling structure 30*b*, a coupling structure 30*c*, and a coupling structure 30*d*. The coupling structure 30*a* is disposed between the subchip 20*a* and the subchip 20*b*, and is configured to implement an interconnection between the subchip 20*a* and the subchip 20*b*. The coupling structure 30*b* is disposed between the subchip 20*b* and the subchip 20*c*, and is configured to implement an interconnection between the subchip 20*b* and the subchip 20*c*. The coupling structure 30*c* is disposed between the subchip 20*c* and the subchip 20*d*, and is configured to implement an interconnection between the subchip 20*c* and the subchip 20*d*. The coupling structure 30*d* is disposed between the subchip 20*d* and the subchip 20*a*, and is configured to implement an interconnection between the subchip 20*d* and the subchip 20*a*. Finally, the four subchips are interconnected by using the four coupling structures.

A second coupling structure 30*e* is a coupling structure disposed between two subchips disposed diagonally. The second coupling structure 30*e* is disposed between the subchip 20*a* and the subchip 20*c*, and is configured to implement a connection between the subchip 20*a* and the subchip 20*c*. In addition, the coupling structure 30*e* is disposed between the subchip 20*b* and the subchip 20*d*, and is configured to implement a connection between the subchip 20*b* and the subchip 20*d*.

In some implementations, the first coupling structures and the second coupling structure may alternatively be directly connected, to implement a faster coupling speed among the subchips, thereby helping improve performance of the quantum chip 01.

Figure 5:
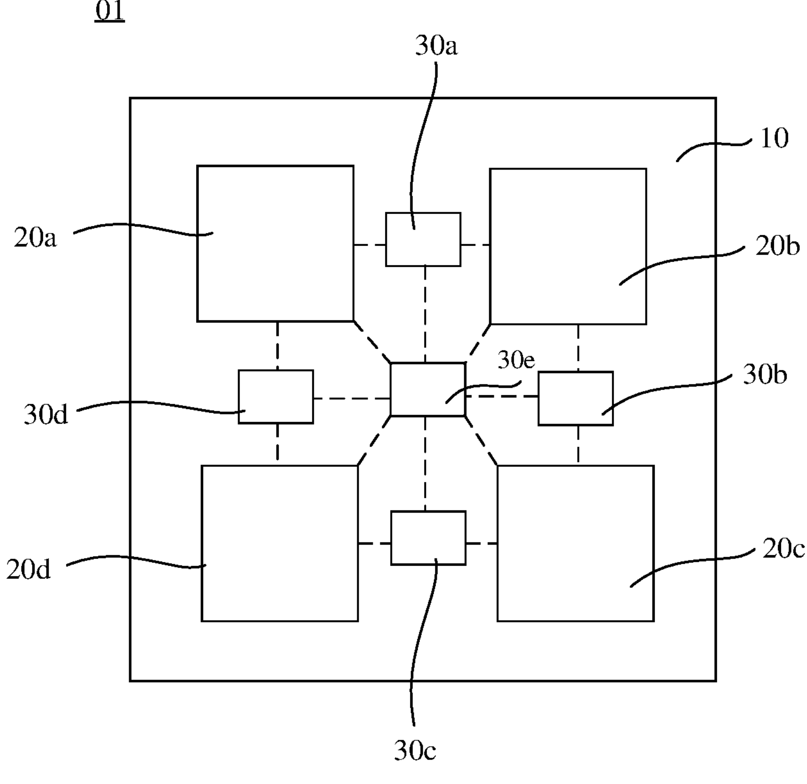
FIG. 5 is a schematic diagram of a flat structure of another quantum chip according to an embodiment of the present disclosure.

For example, as shown in FIG. 5, in another embodiment provided in the present disclosure, the second coupling structure 30*e* is connected to the first coupling structures (including the coupling structures 30*a*, 30*b*, 30*c* and 30*d*).

Alternatively, in some implementations, the second coupling structure 30*e* may not establish direct connection relationships with the subchips, but is connected to only the first coupling structures.

Figures 6, 7:
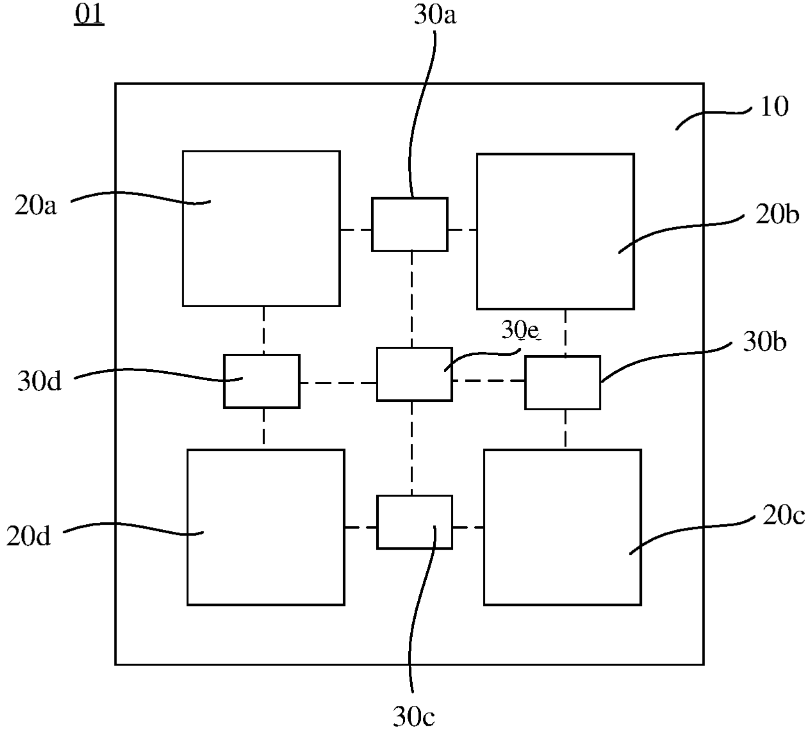
FIG. 6 is a schematic diagram of a flat structure of another quantum chip according to an embodiment of the present disclosure.
FIG. 7 is a schematic diagram of a partial connection structure of a quantum chip according to an embodiment of the present disclosure.

For example, as shown in FIG. 6, in another embodiment provided in the present disclosure, the second coupling structure 30*e* is connected to the first coupling structures (including the coupling structures 30*a*, 30*b*, 30*c* and 30*d*). In addition, the second coupling structure 30*e* has no direct connection relationship with the subchip 20*a*, the subchip 20*b*, the subchip 20*c*, and the subchip 20*d*. In this connection manner, the coupling speed among the subchips can be improved to a specific extent, and difficulty and complexity in arranging a line can be simplified.

In the foregoing implementations, a specific arrangement and a connection relationship of the coupling structure 30 are illustrated when the plurality of subchips 20 are arranged in the rectangular array manner. It should be understood that, in another implementation, when the plurality of subchips 20 are arranged in a manner (for example, a circular array or a polygonal array) other than the rectangular array, a layout of the coupling structure 30 is flexibly set and adjusted in a same or similar form as described above. This is not limited in the present disclosure.

In example embodiments, the coupling structure 30 may be a resonant cavity, a capacitor, or the like.

The resonant cavity is a metal cavity in which a high-frequency electromagnetic field oscillates continuously. Because the electromagnetic field may be completely concentrated in the metal cavity, no radiation losses are generated. Therefore, a high quality factor is provided, and efficient and stable coupling between the subchips 20 can be ensured. There is a plurality of types of resonant cavities. In an example embodiment, a type of the resonant cavity may be properly selected based on an actual situation. For example, a single half-wavelength coplanar waveguide resonant cavity may be used to implement an interconnection between two subchips 20. Alternatively, a cascading half-wavelength coplanar resonant cavity may be used to implement the interconnection.

During specific connection, a signal end of the resonant cavity may be connected to the subchip 20 by using a circuit in the substrate 10. Alternatively, the signal end of the resonant cavity may be connected to the subchip 20 through an additional metal wire.

In an example embodiment, two subchips 20 may be connected by using one resonant cavity 30, or may be connected by using a plurality of resonant cavities 30.

For example, as shown in FIG. 7, the subchip 20*a* and the subchip 20*b* may be connected by using one resonant cavity 30.

Figure 8:
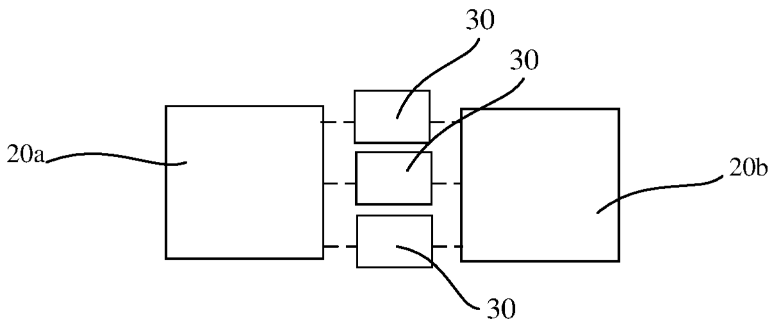
FIG. 8 is a schematic diagram of a partial connection structure of another quantum chip according to an embodiment of the present disclosure.

As shown in FIG. 8, the subchip 20*a* and the subchip 20*b* may be connected by using three resonant cavities 30, so that signal transmission efficiency between the two subchips 20 can be improved. In example embodiments, a quantity of resonant cavities 30 configured to connect the two subchips 20 is not limited in the present disclosure.

In addition, when the coupling structure 30 is a capacitor, the capacitor may be an independent component, or may be a structure integrated on the substrate 10.

Figure 9:
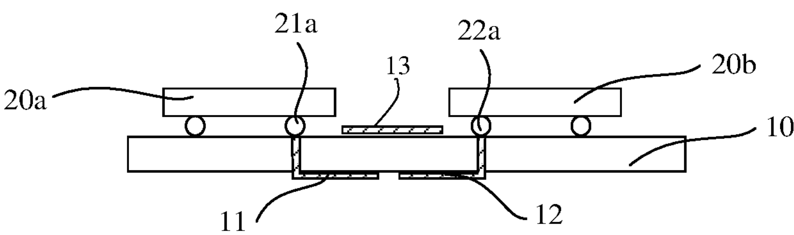
FIG. 9 is a schematic diagram of a cross-section structure of a quantum chip according to an embodiment of the present disclosure.

For example, as shown in FIG. 9, in an embodiment provided in the present disclosure, a first electrode layer 11 and a second electrode layer 12 are disposed on a lower surface of the substrate 10. The first electrode layer 11 is connected to a solder joint 21*a* of the subchip 20*a*, to implement a connection between the first electrode layer 11 and the subchip 20*a*. The second electrode layer 12 is connected to a solder joint 22*a* of the subchip 20*b*, to implement a connection between the second electrode layer 12 and the subchip 20*b*. The upper surface of the substrate 10 is provided with a third electrode layer 13. The substrate 10 may be used as a dielectric layer, so that the first electrode layer 11, the second electrode layer 12, and the third electrode layer 13 form a coupling capacitor, thereby implementing a connection between the subchip 20*a* and the subchip 20*b*.

It may be understood that, in another implementation, the dielectric layer may alternatively be separately prepared.

Figure 10:
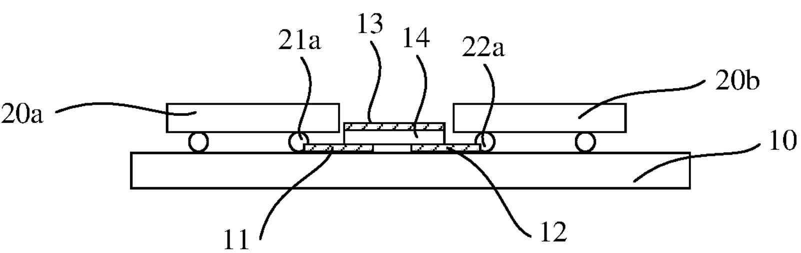
FIG. 10 is a schematic diagram of a cross-section structure of another quantum chip according to an embodiment of the present disclosure.

For example, as shown in FIG. 10, in another embodiment provided in the present disclosure, the first electrode layer 11 and the second electrode layer 12 are disposed on the upper surface of the substrate 10. The first electrode layer 11 is connected to the solder joint 21*a* of the subchip 20*a*, to implement the connection between the first electrode layer 11 and the subchip 20*a*. The second electrode layer 12 is connected to the solder joint 22*a* of the subchip 20*b*, to implement the connection between the second electrode layer 12 and the subchip 20*b*. A dielectric layer 14 is formed on upper surfaces of the first electrode layer 11 and the second electrode layer 12, and the third electrode layer 13 is formed on an upper surface of the dielectric layer 14. The first electrode layer 11, the second electrode layer 12, the dielectric layer 14, and the third electrode layer 13 form a coupling capacitor, to implement the connection between the subchip 20*a* and the subchip 20*b*.

It may be understood that a specific type, a quantity, and a position of the coupling structure 30 may be flexibly selected and adjusted based on different requirements. This is not limited in the present disclosure.

In addition, when the cavity mode suppression structure 40 is disposed, a type and arrangement of the cavity mode suppression structure 40 may also be flexibly selected and adjusted.

Figure 11:
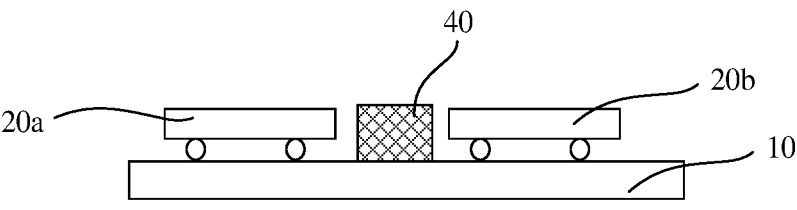
FIG. 11 is a schematic diagram of a cross-section structure of another quantum chip according to an embodiment of the present disclosure.

For example, as shown in FIG. 11, the cavity mode suppression structure 40 may be a metal body, or may be a silicon body or a solid structure of another insulation material whose surface is provided with a metal layer. When the cavity mode suppression structure 40 is a metal body, the metal body may be formed by using a superconducting metal material (for example, niobium zirconium alloy or niobium titanium alloy), and then the formed metal body is disposed on the substrate 10. Alternatively, the metal body may be directly prepared on the substrate 10 by using a process such as micro-nano preparation. When the cavity mode suppression structure 40 is a solid structure whose surface is provided with a metal layer, a solid structure having a specific shape may be formed by using materials such as silicon and ceramics, and then a metal layer is prepared on a surface of the solid structure by using processes such as vapor deposition and spraying. Finally, the formed cavity mode suppression structure 40 is disposed on the substrate 10. A material of the metal layer may be a superconducting material such as niobium zirconium alloy or niobium titanium alloy, or may be another metal material. Alternatively, in some other implementations, a convex structure having a specific shape may be directly prepared on the substrate 10 by using a process such as etching, and then a metal layer is prepared on the convex structure, to form the cavity mode suppression structure 40.

In specific implementations, a shape of the cavity mode suppression structure 40 is not limited in the present disclosure. For example, the cavity mode suppression structure 40 may be an arc-shaped protrusion, or may be a circular, oval, rectangular, or other polygonal column or block structure.

In addition, in some embodiments, the cavity mode suppression structure 40 may alternatively be formed by a solder joint of the subchip 20.

Figure 12:
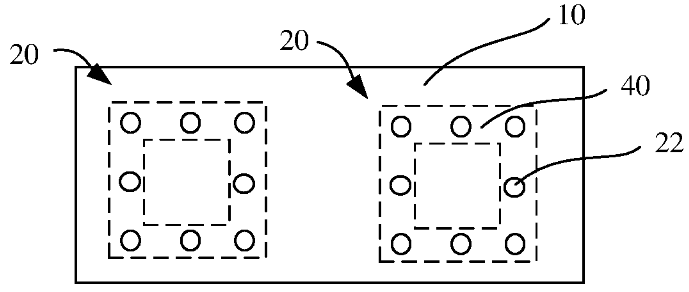
FIG. 12 is a schematic diagram of a flat structure of another quantum chip according to an embodiment of the present disclosure.

For example, as shown in FIG. 12, in an embodiment provided in the present disclosure, a plurality of ground solder joints 22 (eight ground solder joints 22 are shown in the figure) are disposed on an edge of the subchip 20, and each ground solder joint 22 is configured to electrically connect to an electrical connection structure on the substrate 10. After the ground solder joints 22 are connected to the electrical connection structure on the substrate 10, a structure (the cavity mode suppression structure 40) that can increase a cavity mode frequency of the subchip 20 may be formed, thereby effectively increasing the cavity mode frequency of the subchip 20 and eliminating signal crosstalk between the subchips 20.

Certainly, in specific implementation, a quantity and positions of the ground solder joints 22 may also be diversified.

Figure 13:
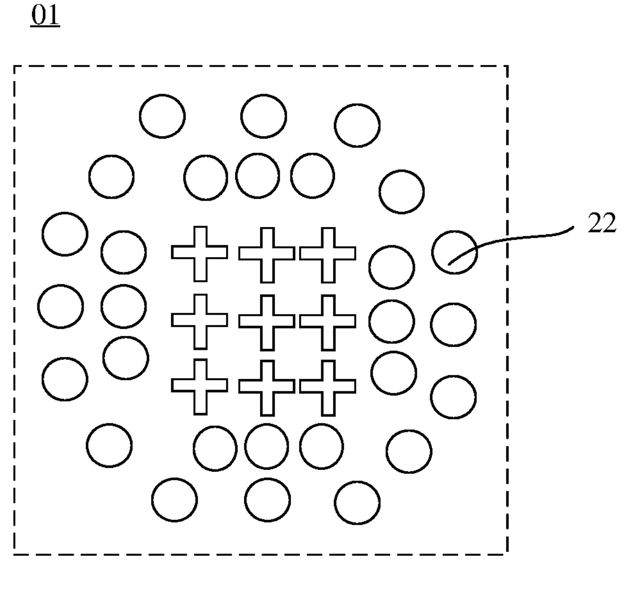
FIG. 13 is a schematic diagram of a flat structure of another quantum chip according to an embodiment of the present disclosure.

For example, as shown in FIG. 13, in an embodiment provided in the present disclosure, a quantity of the ground solder joints 22 is 28. Ground solder joints 22 located on an outermost periphery may form the cavity mode suppression structure 40.

In example embodiments, a distance between two adjacent ground solder joints 22 may be less than one tenth of a wavelength, so that the cavity mode frequency of the subchip 20 is better improved, and signal crosstalk between the subchips 20 is better eliminated. The one tenth of a wavelength is an operating wavelength of the subchip 20.

Alternatively, in another implementation, the distance between the two adjacent ground solder joints 22 may be greater than or equal to the one tenth of a wavelength, and the quantity and arrangement of the ground solder joints 22 may also be flexibly adjusted. This is not limited in the present disclosure. In addition, when the cavity mode suppression structure 40 exists in a form of the ground solder joint 22, the metal body or the cavity mode suppression structure 40 whose surface is provided with a metal layer may be additionally added.

In addition, when the cavity mode suppression structure 40 is a metal body or a solid structure of silicon or another insulation material whose surface is provided with a metal layer, a layout of the cavity mode suppression structure 40 may also be diversified.

Figure 14:
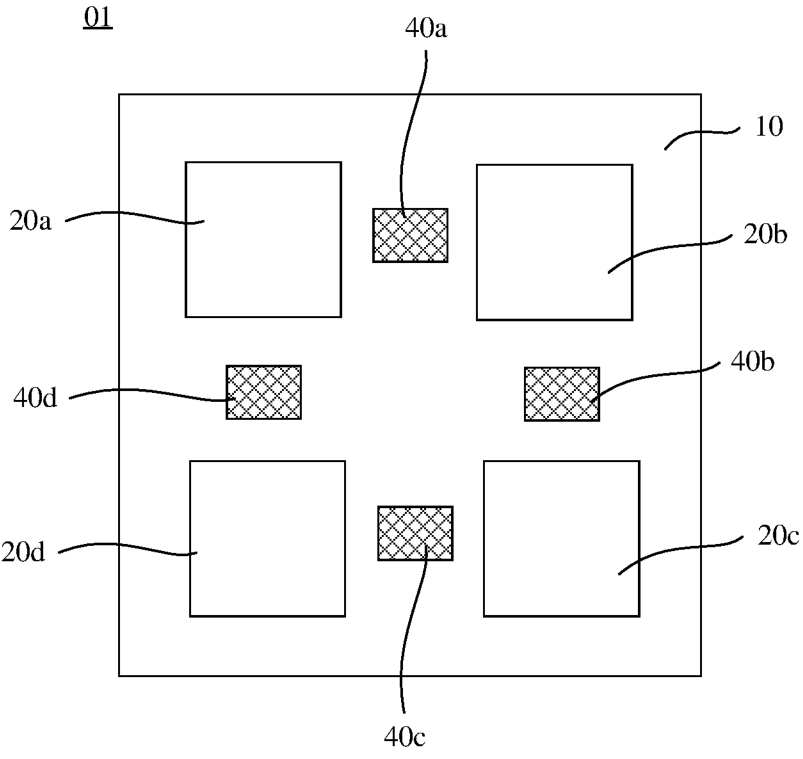
FIG. 14 is a schematic diagram of a flat structure of another quantum chip according to an embodiment of the present disclosure.

For example, as shown in FIG. 14, in an embodiment provided in the present disclosure, the cavity mode suppression structure is disposed between two adjacent subchips, and is configured to increase cavity mode frequencies of the two subchips and reduce signal crosstalk between the two subchips. The four subchips in the figure are respectively a subchip 20*a*, a subchip 20*b*, a subchip 20*c*, and a subchip 20*d*. There are four cavity mode suppression structures, which are respectively a cavity mode suppression structure 40*a*, a cavity mode suppression structure 40*b*, a cavity mode suppression structure 40*c*, and a cavity mode suppression structure 40*d*. The cavity mode suppression structure 40*a* is disposed between the subchip 20*a* and the subchip 20*b*, the cavity mode suppression structure 40*b* is disposed between the subchip 20*b* and the subchip 20*c*, the cavity mode suppression structure 40*c* is disposed between the subchip 20*c* and the subchip 20*d*, and the cavity mode suppression structure 40*d* is disposed between the subchip 20*d* and the subchip 20*a*.

Figure 15:
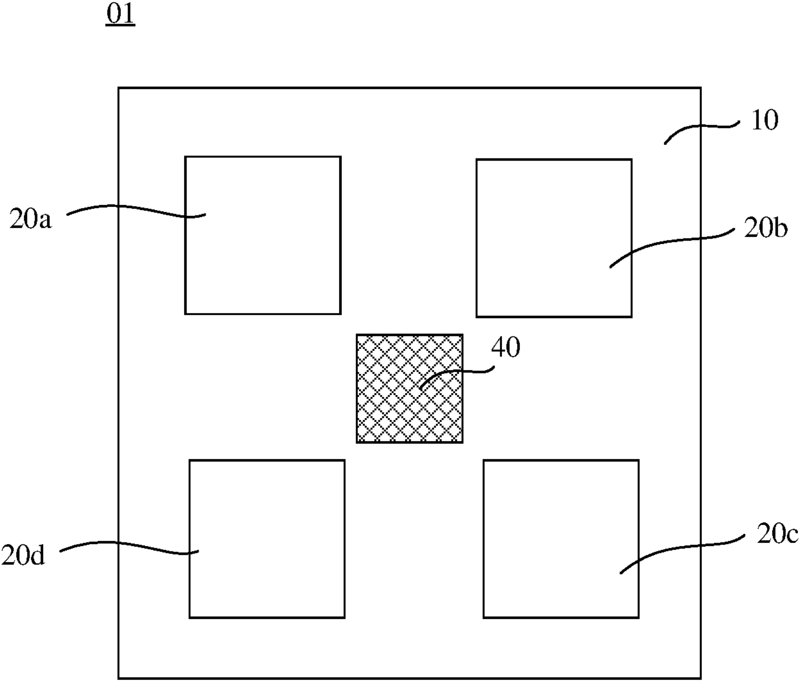
FIG. 15 is a schematic diagram of a flat structure of another quantum chip according to an embodiment of the present disclosure.

As shown in FIG. 15, in another embodiment provided in the present disclosure, the cavity mode suppression structure 40 is disposed between two subchips disposed diagonally. The cavity mode suppression structure 40 is disposed between the subchip 20*a* and the subchip 20*c*, and the cavity mode suppression structure 40 is disposed between the subchip 20*b* and the subchip 20*d*. That is, the cavity mode suppression structure 40 can not only increase cavity mode frequencies of the four subchips 20*a*, 20*b*, 20*c*, and 20*d*, but also reduce signal crosstalk among the four subchips 20*a*, 20*b*, 20*c*, and 20*d*.

Certainly, when the coupling structure 30 and the cavity mode suppression structure 40 are disposed at the same time, the coupling structure 30 and the cavity mode suppression structure 40 may also be flexibly disposed, to avoid adverse effects such as interference between the coupling structure 30 and the cavity mode suppression structure 40.

Figure 16:
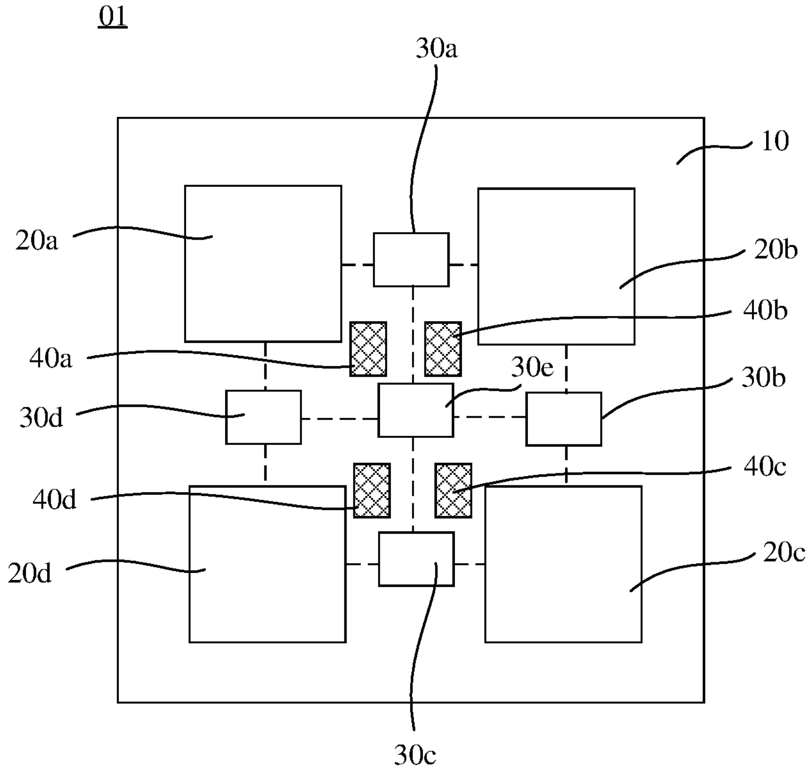
FIG. 16 is a schematic diagram of a flat structure of another quantum chip according to an embodiment of the present disclosure.

As shown in FIG. 16, in another embodiment provided in the present disclosure, there are five coupling structures, which are respectively coupling structures 30*a*, 30*b*, 30*c*, 30*d*, and 30*e*. There are four cavity mode suppression structures, which are respectively cavity mode suppression structures 40*a*, 40*b*, 40*c* and 40*d*. The cavity mode suppression structure 40*a* is disposed in a space enclosed by the subchip 20*a*, the coupling structure 30*a*, the coupling structure 30*d*, and the coupling structure 30*e*. The cavity mode suppression structure 40*b* is disposed in a space enclosed by the subchip 20*b*, the coupling structure 30*a*, the coupling structure 30*b*, and the coupling structure 30*e*. The cavity mode suppression structure 40*c* is disposed in a space enclosed by the subchip 20*c*, the coupling structure 30*b*, the coupling structure 30*c*, and the coupling structure 30*e*. The cavity mode suppression structure 40*d* is disposed in a space enclosed by the subchip 20*d*, the coupling structure 30*c*, the coupling structure 30*d*, and the coupling structure 30*e*. In this disposing manner, functions of each coupling structure and each cavity mode suppression structure can be effectively ensured. In addition, layout density of the quantum chip 01 can be improved, and a volume of the quantum chip 01 can be reduced.

Alternatively, in other example embodiments, direct connection relationships may be established between the coupling structure 30*e* and the other four coupling structures.

Figure 17:
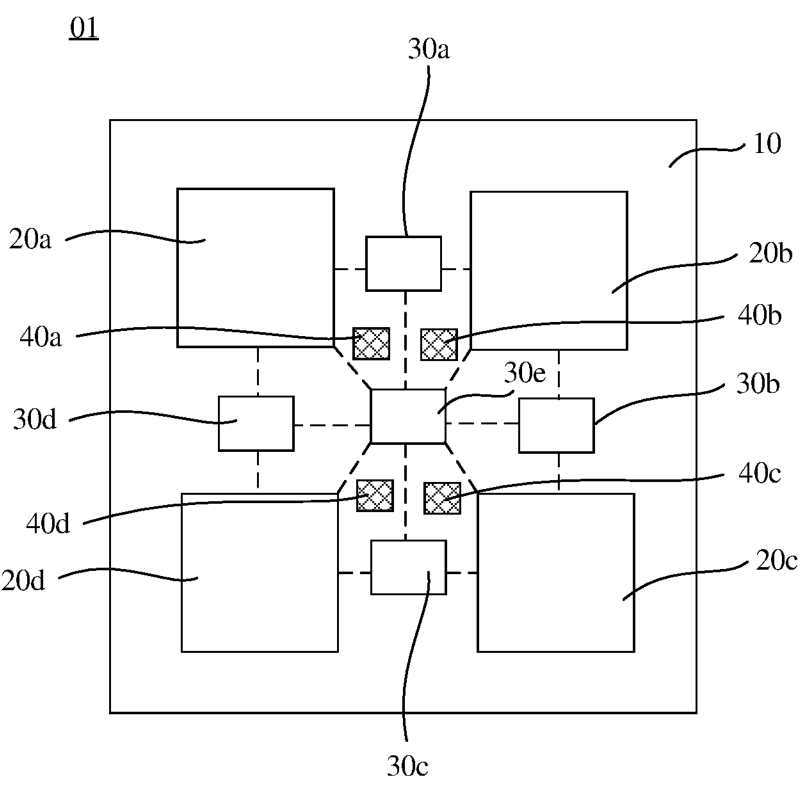
FIG. 17 is a schematic diagram of a flat structure of another quantum chip according to an embodiment of the present disclosure.

For example, as shown in FIG. 17, the coupling structure 30*e* is connected to the coupling structures 30*a*, 30*b*, 30*c*, and 30*d*.

In the foregoing example, the coupling structures 30 and the cavity mode suppression structures 40 are spaced apart on the substrate 10, to prevent the coupling structures 30 and the cavity mode suppression structures 40 from adverse effect such as position interference. It may be understood that, in another implementation, relative positions between the coupling structures 30 and the cavity mode suppression structures 40 may alternatively be arranged in another manner.

Figure 18:
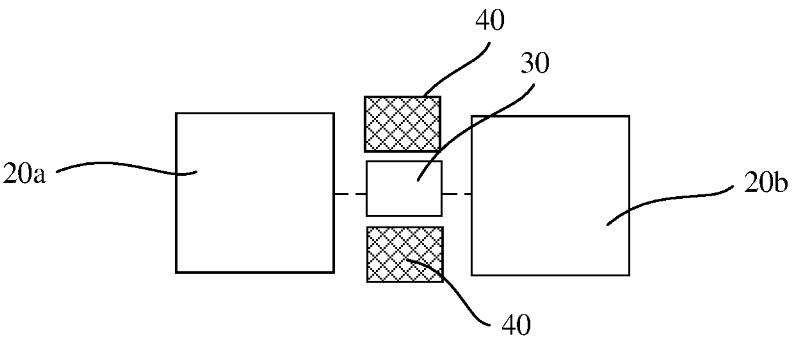
FIG. 18 is a schematic diagram of a partial flat structure of another quantum chip according to an embodiment of the present disclosure.

For example, as shown in FIG. 18, in another embodiment provided in the present disclosure, one coupling structure 30 and two cavity mode suppression structures 40*a*, 40*b* are disposed between the subchip 20*a* and the subchip 20*b*. The coupling structure 30*a* is located between the two cavity mode suppression structures 40*a* and 40*b*.

It may be understood that, in another implementation, the subchip 20*a* and the subchip 20*b* may alternatively be connected by using two or more coupling structures 30. Correspondingly, one, three, or more cavity mode suppression structures 40 may alternatively be disposed between the subchip 20*a* and the subchip 20*b*.

Figure 19:
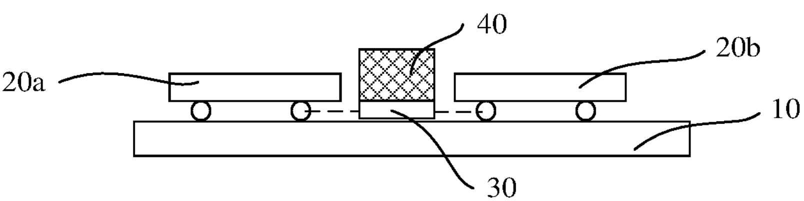
FIG. 19 is a schematic diagram of a cross-section structure of another quantum chip according to an embodiment of the present disclosure.

Alternatively, as shown in FIG. 19, the coupling structure 30 and the cavity mode suppression structure 40 may be stacked. Both the coupling structure 30 and the cavity mode suppression structure 40 are disposed between the subchip 20*a* and the subchip 20*b*. The coupling structure 30 is disposed on the upper surface of the substrate 10, and the cavity mode suppression structure 40 is disposed on an upper side of the coupling structure 30. In this disposing manner, the layout density of the quantum chip 01 may also be improved to a specific extent, and helps reduce the volume of the quantum chip 01.

It should be understood that, in specific implementation, types, quantities, and arrangement of the coupling structure 30 and the cavity mode suppression structure 40 are not limited to content illustrated in the foregoing embodiments.

In specific application, the quantum chip 01 may be applied to any device that follows the laws of quantum mechanics to implement mathematical and logic operations, or implement information processing and storage.

Figure 20:
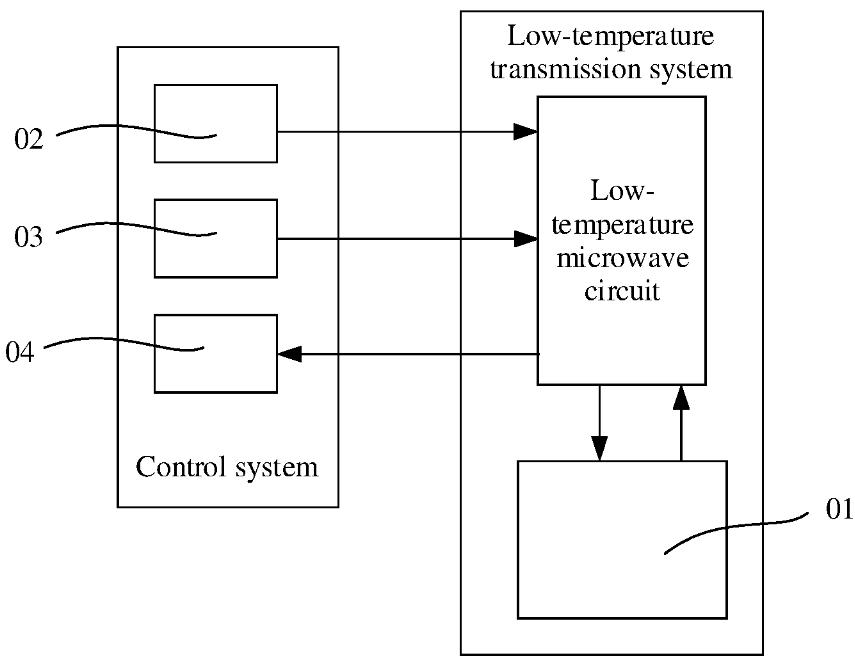
FIG. 20 is a structural block diagram of a quantum computer according to an embodiment of the present disclosure.

For example, as shown in FIG. 20, an embodiment of the present disclosure further provides a quantum computer, including a control system, a low-temperature transmission system, and any one of the foregoing quantum chips 01. The low-temperature transmission system includes a low-temperature microwave circuit, and the control system is connected to the quantum chip 01 by using the low-temperature microwave circuit. The control system is generally placed in a normal temperature area, and a main working principle is that a vector signal generator 02 is configured to generate a microwave control signal, and an arbitrary wave generator is configured to generate a gate control signal. The two types of control signals are transmitted to the quantum chip 01 by using the low-temperature microwave circuit, to perform operations such as frequency tuning, state flipping, and energy level transition on a quantum bit. An ADC (analog-to-digital converter) is configured to collect and process a quantum signal. The quantum signal of the quantum bit is transmitted to the ADC through the low-temperature microwave circuit, to read quantum bit information. The low-temperature transmission system may include a refrigeration component (for example, a refrigerator). The refrigeration component is configured to provide a low temperature environment for the low-temperature microwave circuit and the quantum chip 01, to create a superconducting condition for the low-temperature microwave circuit and the quantum chip and prevent adverse effects such as thermal noise.

The foregoing descriptions are merely non-limiting examples of specific implementations of the present disclosure, and are not intended to limit the protection scope, which is intended to cover any variation or replacement readily determined by a person of ordinary skill in the art. Therefore, the claims shall define the protection scope.

What is claimed is:

1. A quantum chip, comprising:

a substrate;

M subchips, wherein each of the M subchips comprises N quantum bits, and the M subchips are spaced apart on a surface of the substrate;

a coupling structure, configured to implement an interconnection between the M subchips; and a cavity mode suppression structure, disposed on an edge of each of the M subchips and/or in a gap between the M subchips, and configured to increase a cavity mode frequency of the quantum chip, wherein M is a positive integer greater than 1, and N is a positive integer greater than or equal to 1, wherein the coupling structure comprises a first coupling structure and a second coupling structure;

the first coupling structure is disposed between two adjacent subchips, and is configured to implement a connection between the two adjacent subchips; and the second coupling structure is disposed between two subchips disposed diagonally, and is configured to implement a connection between the two subchips disposed diagonally.

2. The quantum chip according to claim 1, wherein the coupling structure is a resonant cavity or a capacitor.

3. The quantum chip according to claim 1, wherein the cavity mode suppression structure is disposed on the edge of each of the M subchips; and a plurality of ground solder joints is disposed on edges of the M subchips, the plurality of ground solder joints is electrically connected to the substrate, and the plurality of ground solder joints constitute the cavity mode suppression structure.

4. The quantum chip according to claim 1, wherein the cavity mode suppression structure is disposed in the gap between the M subchips; and the cavity mode suppression structure is a metal body or a solid structure, of which a surface is provided with a conductive layer.

5. The quantum chip according to claim 1, wherein the cavity mode suppression structure is an arc-shaped protrusion, a circular, an oval, a rectangular, or other polygonal column or block structure.

6. The quantum chip according to claim 1, wherein the M subchips are disposed in a rectangular array.

7. The quantum chip according to claim 1, wherein the first coupling structure is connected to the second coupling structure.

8. The quantum chip according to claim 1, wherein the M subchips are disposed on the substrate in a flip-chip or wire bonding manner.

9. The quantum chip according to claim 1, further comprises a first electrode layer and a second electrode layer disposed on a surface of the substrate.

10. The quantum chip according to claim 9, wherein the first electrode layer is connected to a solder joint of one of the M subchips, to implement a connection between the first electrode layer and the subchip, and the second electrode layer is connected to a solder joint of another one of the M subchips, to implement a connection between the second electrode layer and the other subchip.

11. The quantum chip according to claim 9, further comprises a third electrode layer disposed on an upper surface of the substrate, wherein the first electrode layer and the second electrode layer are disposed on a lower surface of the substrate, the substrate is used as a dielectric layer, and the first electrode layer, the second electrode layer, and the third electrode layer form a coupling capacitor.

12. The quantum chip according to claim 9, further comprises a dielectric layer formed on upper surfaces of the first electrode layer and the second electrode layer, and a third electrode layer formed on an upper surface of the dielectric layer, wherein the first electrode layer and the second electrode layer are disposed on an upper surface of the substrate, and the first electrode layer, the second electrode layer, the dielectric layer, and the third electrode layer form a coupling capacitor.

13. The quantum chip according to claim 1, wherein the coupling structure and the cavity mode suppression structure are spaced apart on the substrate, or the coupling structure and the cavity mode suppression structure are stacked.

14. A quantum computer, comprising a control system, a low-temperature transmission system, and a quantum chip, wherein the quantum chip includes:

a substrate;

M subchips, wherein each of the M subchips comprises N quantum bits, and the M subchips are spaced apart on a surface of the substrate;

a coupling structure, configured to implement an interconnection between the M subchips; and a cavity mode suppression structure, disposed on an edge of each of the M subchips and/or in a gap between the M subchips, and configured to increase a cavity mode frequency of the quantum chip, wherein M is a positive integer greater than 1, and N is a positive integer greater than or equal to 1, and the control system transmits one or more signals to the quantum chip by using the low-temperature transmission system, wherein the coupling structure comprises a first coupling structure and a second coupling structure;

the first coupling structure is disposed between two adjacent subchips, and is configured to implement a connection between the two adjacent subchips; and the second coupling structure is disposed between two subchips disposed diagonally, and is configured to implement a connection between the two subchips disposed diagonally.

15. The quantum computer according to claim 14, wherein the low-temperature transmission system comprises a refrigeration component and a low-temperature microwave circuit, the refrigeration component is configured to cool the low-temperature microwave circuit.

16. The quantum chip according to claim 3, wherein a distance between two adjacent ground solder joints of the plurality of ground solder joints is less than one tenth of an operating wavelength of the subchips.

17. The quantum computer according to claim 14, wherein the second coupling structure is connected to the first coupling structure.

* * * * *